United States Patent
Ookuma et al.

(10) Patent No.: US 6,867,936 B2
(45) Date of Patent: Mar. 15, 2005

(54) DRIVING CIRCUIT FOR A MAGNETIC HEAD AND MAGNETIC RECORDING APPARATUS

(75) Inventors: Yasuyuki Ookuma, Kokubunji (JP); Kenji Maio, Tokyo (JP); Yoichiro Kobayashi, Ome (JP); Hiroyasu Yoshizawa, Ome (JP)

(73) Assignee: Hitachi, Ltd., Tokyo (JP)

( * ) Notice: Subject to any disclaimer, the term of this patent is extended or adjusted under 35 U.S.C. 154(b) by 473 days.

(21) Appl. No.: 09/941,867

(22) Filed: Aug. 30, 2001

(65) Prior Publication Data

US 2002/0105746 A1 Aug. 8, 2002

(30) Foreign Application Priority Data

Feb. 7, 2001 (JP) ........................................ 2001-030383

(51) Int. Cl.[7] .................................................. G11B 5/09
(52) U.S. Cl. .............................. 360/46; 360/68; 360/66
(58) Field of Search .............................. 360/46, 68, 66, 360/67, 323; 327/108, 110, 494

(56) References Cited

U.S. PATENT DOCUMENTS 5,282,094 A * 1/1994 Ngo ............................ 360/46

6,614,273 B2 * 9/2003 Teterud et al. .............. 327/110

OTHER PUBLICATIONS

Steven Lam, Lawrence Cheng and David Young, "A 550Mb/s GMR Read/Write Amplifier Using 0.5 μm 5V CMOS Process" 2000 IEEE International Solid–State Circuits Conference, Feb. 9, 2000, pp. 358–359 and 470–471.

* cited by examiner

Primary Examiner—Alan T. Faber
(74) Attorney, Agent, or Firm—Reed Smith LLP; Stanley P. Fisher, Esq.; Juan Carlos A. Marquez, Esq.

(57) ABSTRACT

A magnetic head driving circuit includes a main driving circuit symmetrical with respect to a centered recording coil, and at least two pairs of adding circuits, each pair including a positive pulse adding circuit and a negative pulse superposed circuit symmetrical with respect to the centered coil. And, by reversing the direction of the magnetic head coil current, at least one of the adding circuits is made to operate and make it as a magnetic head driving circuit for adding a potential equal to or higher than the power supply, thereby to drive as a sub-driving circuit arranged symmetrically with respect to the centered coil, which promotes the reversal of the magnetic head coil current, and which drives stably with a central potential of the coil at about the disk potential.

7 Claims, 8 Drawing Sheets

DRIVING CIRCUIT FOR A MAGNETIC HEAD AND MAGNETIC RECORDING APPARATUS

BACKGROUND OF THE INVENTION

1. Field of the Invention

The present invention relates to a magnetic recording apparatus for generating, by a magnetic head, a magnetic field corresponding to data intended to record, and for recording the data on a recording medium by the generated magnetic field.

2. Description of the Related Art

Recently, in the magnetic recording apparatus such as a hard disk apparatus, the recording density has rapidly increased, and the writing speed has also increased.

In the magnetic recording apparatus, the writing of data is performed by reversing the direction of the current flowing through a magnetic head coil positioned close to a recording medium on which the writing is to be made, in accordance with the data to be recorded.

FIG. 10 shows an outline of a magnetic head driving circuit of a magnetic recording apparatus (STEVE, L., DAVID, Y., "A 550 MB/S GMR READ/WRITE AMPLIFIER USING 0.5 UM 5V CMOS PROCESS", ISSCC2000, PP358–359, FEBRUARY, 2000). In FIG. 10, the magnetic head driving circuit is formed by PMOS transistors MP1, MP2, and NMOS transistors MN7 to MN10 which operate as switches, NMOS transistors MN1, MN2, and PMOS transistors MP3, MP4 which operate as protection devices, and a current mirror circuit including NMOS transistors MN3 to MN7, MN10, and a current source IS1, and a DAMPING-RESISTOR circuit. This circuit is operated at a timing shown in FIG. 11, and each transistor and the DAMPING-RESISTOR circuit are controlled. A magnetic head coil is formed by an inductance component Lh and a resistance component Rh. At a time t1, by turning off the PMOS transistor MP1 and the NMOS transistor MN10 which have been turned on, and at the same time, by turning on the PMOS transistor MP2 and the NMOS transistor MN7 which have been turned off, the current which has been flowing in the magnetic head coil from a node HWL towards a node HWR is reversed to flow from the node HWR towards the node HWL, at this time due to the turning on of the NMOS transistor MN8 only during a time interval until a time t2, a large voltage (here, the power supply voltage) is applied across both terminals of the magnetic head coil so that the reverse time of the current is shortened. Next, from the time t2 to the time t3, assuming that the current flowing in the current source IS1 is IW1, in the magnetic head coil, a constant current IW1 flows from the node HWR towards the node HWL. Next, at the time t3, the PMOS transistor MP2 and the NMOS transistor MN7 which have been turned on are turned off, and at the same time, the PMOS transistor MP1 and the NMOS transistor MN10 which have been turned off are turned on, so that the current which has been flowing in the magnetic head coil from the node HWR towards the node HWL is reversed to flow from the node HWL towards the node HWR. At this time, since the NMOS transistor MN9 is turned on only until the time t4, similar to the time period between the time t2 and the time t3, a large voltage (here, the power supply voltage) is applied in a reverse direction to the case mentioned above across both terminals of the magnetic head coil, and the reverse time of the current is shortened. During the time period between the time t4 and the time t5, a current IW1 flows from the node HWL towards the node HWR, and thereafter from the time t5, performs the operation from the time t1 repeatedly. Here, in the circuit described above, the problems mentioned below are supposed.

First, as a first problem, in recent years, there is a trend that the power supply voltage of the integrated circuits becomes lower than the withstand voltage of the transistors due to the fact that the device is made smaller, and the operating speed is made faster, and recently, it is 3V to 5V or lower. In the magnetic head driving circuit described in the foregoing, when the power supply voltage becomes low, the time required for reversing the current of the magnetic head coil increases. Furthermore, due to an increase of the data transfer speed accompanied by a large capacity of recent magnetic disk apparatus, further high speed rise/fall is requested, and in order to realize the high speed rise/fall with the above-mentioned magnetic head driving circuit, the power supply voltage must be increased. However, in the case of considering the withstand voltage of the device, it is necessary to insert at many stages the protection devices such as the transistors MP3, MP4, MN1, and MN2, and then in turn, the on-resistances of the protection devices can not be neglected. In order to decrease the on-resistance, it is necessary to increase the size of the protection devices. In particular, in the integrated circuits, the chip size, and the parasitic capacitance are increased, and this raises a problem in view of the economy and the switching speed.

Next, in recent years, there is a trend that the distance between the magnetic head and the recording medium is reduced (several tens of nm), and it is desired that the central potential of the magnetic head coil is stable near the disk potential from the view point of discharge prevention between the magnetic head and the disk. However, in the present circuit, assuming that the current flowing in the current source IS1 is IW1, the resistance of the magnetic head coil RH≈0, and the on-resistance of each transistor is; RMP1=RMP2=RPON1, RMP3=RMP4=RPON2, RMN1=RMN2=RNON1, RMN8=RMN9=RNON2, at the time t1, the central potential VHC of the magnetic head coil is changed from VCC−IW1×(RPON1+RPON2) to VCC×(RPON1+RNON2)/(RPON1+RPON2+RNON1+RNON2) potential, and at the time t2, returns to VCC−IW1×(RPON1+RPON2). Here, since each transistor MP1 to MP4, MN1, MN2, MN7, MN8 is a switch and a protection device, assuming that its on-resistance is sufficiently small and equal, ultimately, the central potential of the magnetic head coil becomes approximately VCC→VCC/2→VCC as shown in FIG. 11. Also, at times t3, and t4, a similar change is exhibited, and there is also a problem that at the time of reversal of the direction of the magnetic head coil current, the central potential of the magnetic head coil is varied to a great extent.

SUMMARY OF THE INVENTION

The object of the present invention is, even when the power supply voltage is made low, capable of applying a sufficient voltage equal to or greater than the power supply voltage to both terminals of the magnetic head coil while suppressing the voltage applied to a driving transistor at the time of reversal of the magnetic head coil current, thereby to reduce the reverse time of the magnetic head coil current, and to enable to drive the central potential of the magnetic head coil stably at the vicinity of the disk potential even at the time of reversal of the magnetic head coil current. Furthermore, it is intended to realize a magnetic head driving circuit which reduces the reverse time and allows to cause an overshoot.

In order to achieve the object mentioned above, there is provided a magnetic head driving circuit which comprises a main driving circuit including at least one coil for data writing; and a sub-driving circuit including at least two pairs of adding circuits, one of which includes a positive pulse adding circuit connected to one terminal of the coil and a negative pulse adding circuit connected to the other terminal of the coil, and the other of which includes a negative pulse adding circuit and a positive pulse adding circuit, each of the circuits connected to the opposite terminal of the former pair. At the time of reversing the current direction of the coil by the main driving circuit, at least one pair of the adding circuit is operated so that a potential difference equal to or greater than the power supply is applied to both terminals of the coil, thereby to promote the reversal of the current of the coil, and to drive stable with the central potential of the coil being near the disk potential.

DETAILED DESCRIPTION OF THE EMBODIMENTS

Figure 1:
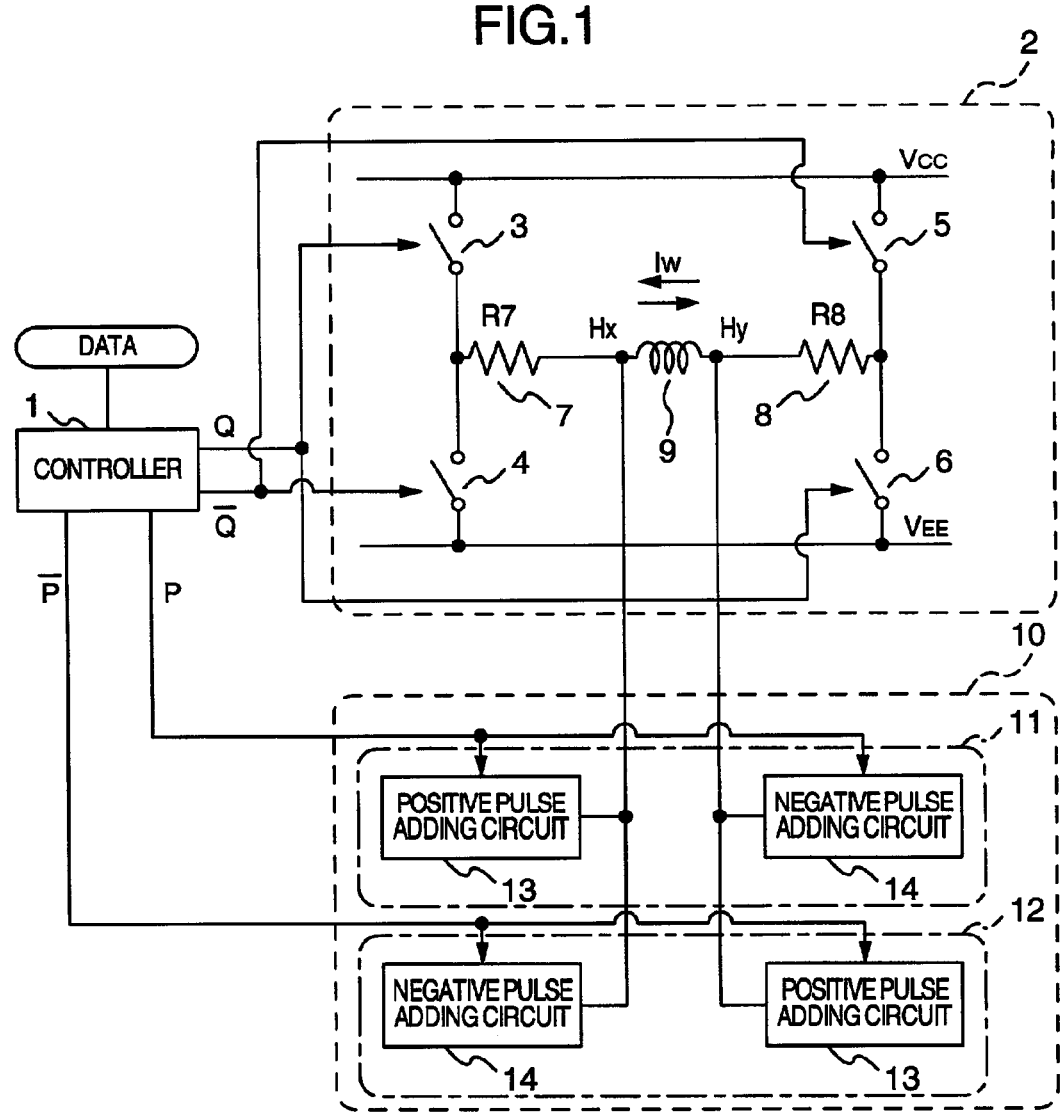
FIG. 1 is a circuit diagram showing a magnetic head driving circuit in an embodiment of the present invention.

Hereinafter, a first embodiment will be explained with reference to the drawings. FIG. 1 shows—a configuration example of the embodiment. As shown in FIG. 1, a magnetic head driving circuit relating to a magnetic recording apparatus is constituted by a controller 1, a main driving circuit 2, a sub-driving circuit 10, and a magnetic head coil 9.

First, the main driving circuit 2 is formed by switches 3 to 6, and resistors 7, 8.

Figure 2:
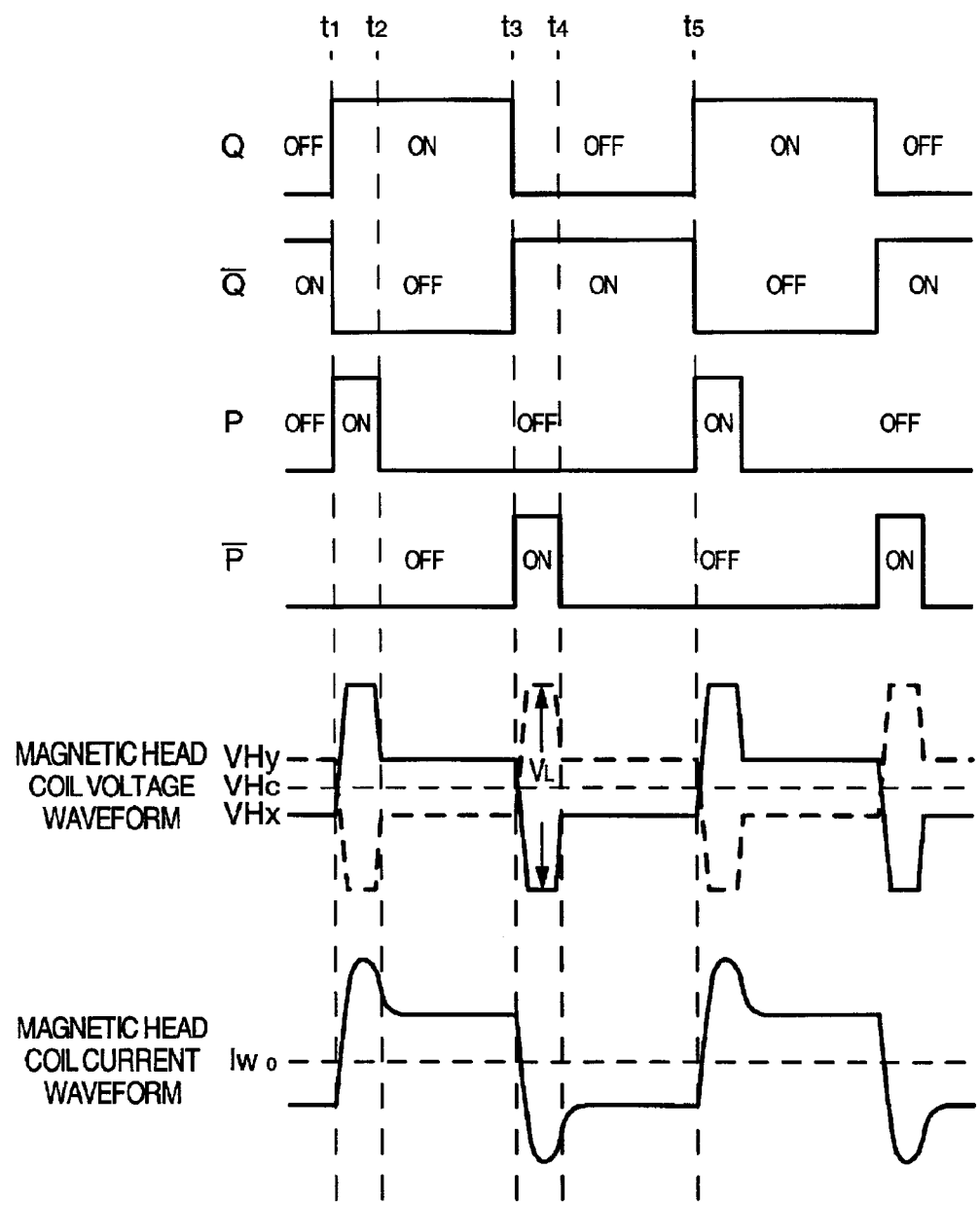
FIG. 2 is a diagram showing waveforms explaining the circuit in FIG. 1.

The controller 1 is a circuit for changing the direction of a magnetizing current Iw flowing through the magnetic head coil 9 by changing over the on/off of the switches 3, 5 and switches 4, 6 of the main driving circuit 2 as shown in FIG. 2, and at the same time generates a control signal of the sub-driving circuit 10. A steady state current Iw is expressed by expression 2, under the condition of expression 1.

Next, the sub-driving circuit 10 is connected symmetrically with respect to the magnetic head coil 9 as two sets (11 and 12), and each set is constituted by a pair of positive pulse adding circuit 13 and negative pulse adding circuit 14.

Next, the operation of the present embodiment will be explained. By the control signal, shown in FIG. 2, output from the controller 1, the main driving circuit 2 and the sub-driving circuit 10 are controlled. At a time t1, the switches 4, 5 having been turned on are turned off, and the switches 3, 6 having been turned off are turned on. Also, at the same time, the adding circuit 11 of the sub-driving circuit 10 is turned on at the time t1 and is turned off at a time t2. At this time, the magnetizing current Iw flowing from a node Hy towards a node Hx is reversed from the node Hx towards the node Hy. On the other hand, by the adding circuit 11 which is turned on at the same time, the potential at both terminals of the magnetic head coil 9 become states as shown in FIG. 2, and a large voltage VL is generated at both terminals of the magnetic head coil 9. Because of this, until the adding circuit 11 is turned off at the time t2, the change of the magnetizing current Iw is promoted, and the reverse time is shortened. Next, during the time t3 to t5, the reverse operation to that mentioned above is carried out. That is, at the time t3, the switches 4, 5 which have been turned off, are turned on, and the switches 3, 6 which have been turned on, are turned off. Also, at the same time, adding circuit 12 of the sub-driving circuit 10 is turned on at the time t3, and is turned off at the time t4. At this time, magnetizing current Iw flowing from the node Hy towards the node Hx is reversed to flow from the node Hx towards the node Hy. On the other hand, due to the adding circuit 12 which is turned on at the same time, the potentials VHx and VHy at both terminals of the magnetic head coil 9 become states as shown in FIG. 2, and a large voltage VL is generated at the time t3 at both terminals of the magnetic head coil 9. Because of this, until the adding circuit 12 is turned off at the time t4, the change of the magnetizing current Iw is promoted, and the reverse time is shortened.

The resistors 7 and 8 limit the current flowing through the magnetic head coil 9 at the steady state, and serve as the output terminals of the main driving circuit 2, and they are always connected in series with the magnetic head coil 9. Owing to this, when a large voltage is generated at both the terminals of the coil, the voltage emerged on the switches is divided by the resistors 7, 8 and the on-resistances of the switches. Normally, since the on-resistance of the switch is sufficiently small, the application of the large voltage to the switch devices can be prevented.

Also, the steady state magnetizing current Iw is expressed by expression 2 under the condition of expression 1.

$$R on3=R on5, \text{ and } R on4=R on6, \text{ and } R7=R8 \quad (1)$$

$$Iw=(Vcc-V_{EE})/(R7+R8+R on3+R on4) \quad (2)$$

In particular, by making the on-resistances Ron3 to Ron6 satisfy the expression 3, and by setting the power supply voltage Vcc and $V_{EE}$ as in expression 4, it is possible to make the central potential of the magnetic head coil 9 at about 0 volt.

$$R on3=R on4=R on5=R on6 \quad (3)$$

$$V_{EE}=-Vcc \quad (4)$$

Next, by symmetrically arranged and symmetrically operating sub-driving circuit 10, as shown in FIG. 2, at the time of changing the direction of the current, a large voltage VL is made to be generated so that the switching time is shortened, and also the central potential VHc of the magnetic head coil 9 is maintained at about the disk potential.

Figure 3:
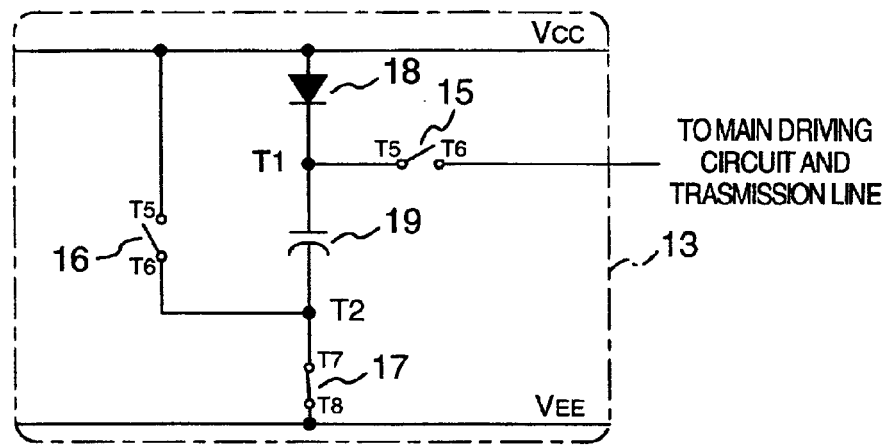
FIG. 3 is a circuit diagram showing a positive pulse adding circuit.
Figure 4:
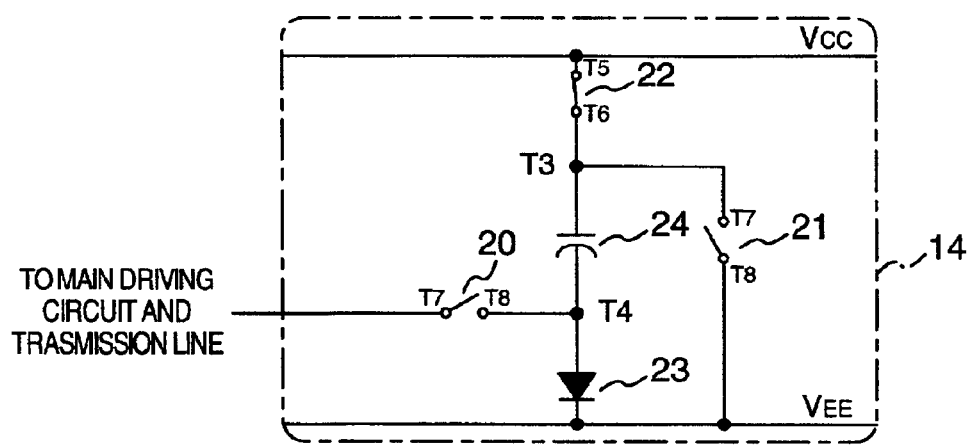
FIG. 4 is a circuit diagram showing a negative pulse adding circuit.

Next, FIGS. 3 and 4 show a configuration example of the adding circuit. First, the positive pulse adding circuit 13 shown in FIG. 3 includes switches 15 to 17, a diode 18 and a capacitor 19. The positive pulse adding circuit 13 is controlled by a signal from the controller 1 at a non-operating time and at an operating time. In the positive pulse adding circuit 13, at the non-operating time, the switches 15 and 16 are in off-state, and the switch 17 enters on-state, and by forming a series circuit of the diode 18 and the capacitor 19, the capacitor 19 is charged, and the voltage Vc of expression 5 is generated at both terminals of the capacitor 19.

$$Vc = Vcc - V_{EE} - Vpn \quad (5)$$

But, Vpn is a forward voltage of the diode 18, and it is supposed that the on-resistance of the switches can be neglected.

Also, at the operating time, since the switches 15 and 16 enter the on-state, and the switch 17 enters the off-state, the voltage at a node T2 is Vcc, and a node T1 indicates a voltage VT1 given by expression 6. At this time, the diode 18 is reverse-biased and automatically turned off.

$$V_{T1} = 2Vcc - V_{EE} - Vpn \quad (6)$$

But, Vpn is a forward voltage of the diode 18, and it is supposed that the on-resistance of the switches can be neglected.

Next, the negative pulse adding circuit 14 includes switches 20 to 22 and a diode 23 and a capacitor 24, and performs a reverse operation to the above-mentioned positive pulse adding circuit 13. Specifically, by the controller 1, similar to the positive pulse adding circuit 13, the operating time and the non-operating time are controlled, and at the non-operating time, switches 20 and 21 become the off state, the switch 22 becomes on state, and by constituting a series circuit of a diode 23 and a capacitor 24, the capacitor 24 is charged, and similar to the positive pulse adding circuit 13, a voltage Vc is emerged at both terminals of the capacitor 24. Also, at the operating time, since the switches 20 and 21 become the on-state, and the switch 22 becomes the off-state, the voltage of a node T3 is $V_{EE}$, and the voltage VT4 given by the expression 7 is emerged at a node T4. At this time, the diode 23 is reverse-biased and automatically turned off.

$$V_{T4} = 2V_{EE} - Vcc + Vpn \quad (7)$$

But, Vpn is a forward voltage of the diode 23, and it is supposed that the on-resistance of the switches can be neglected.

From the above description, the potentials VHx, VHy at both terminals of the magnetic head coil 9 shown in FIG. 2, and the potential difference VL generated in the magnetic head coil 9 is expressed as follows.

$$VHx = 2Vcc - V_{EE} - Vpn \quad (8)$$

$$VHy = 2V_{EE} - Vcc + Vpn \quad (9)$$

$$VL = 3(Vcc - V_{EE}) - 2Vpn \quad (10)$$

Also, the potential VHx, VHy at both terminals of the magnetic head coil 9 at a node T3 are similarly expressed as follows, and the voltage VL the same as expression 10, at both terminals of the coil is obtained.

$$VHx = 2V_{EE} - Vcc + Vpn \quad (11)$$

$$VHy = 2Vcc - V_{EE} - Vpn \quad (12)$$

Figure 5:
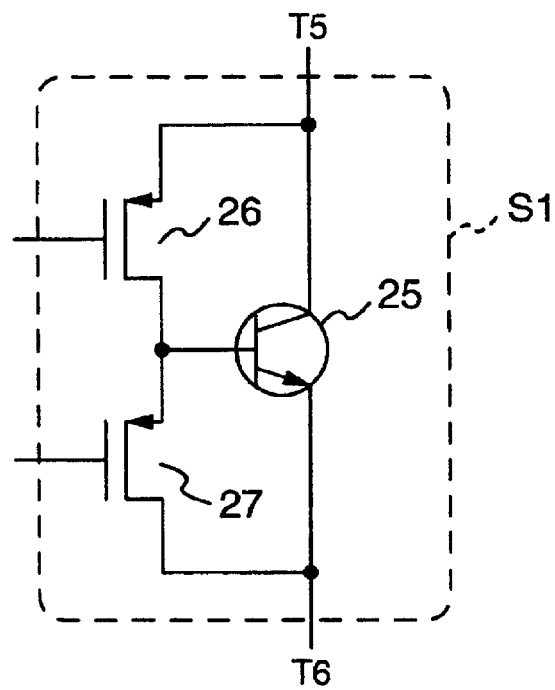
FIG. 5 is a circuit diagram showing a specific example of a switch.
Figure 6:
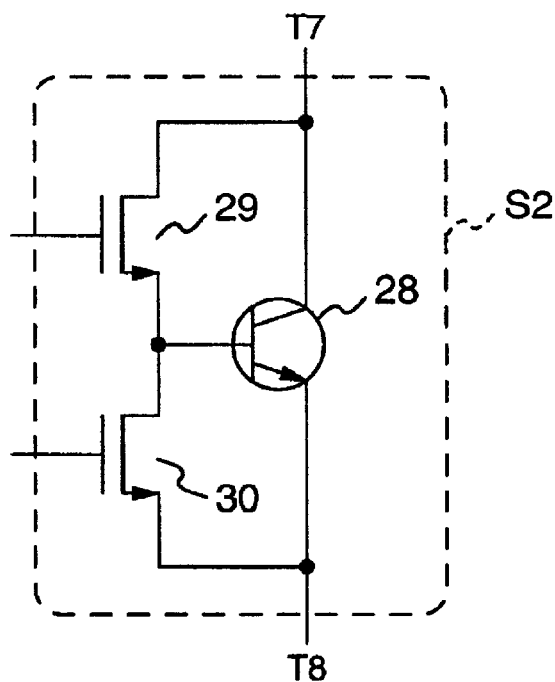
FIG. 6 is a circuit diagram showing another specific example of a switch.

Next, referring to FIGS. 5 and 6, examples of concrete configuration of the switches 15 to 17, 20 to 22 in the positive pulse adding circuit 13 and the negative pulse adding circuit 14 will be explained. In the present embodiment, the switches 15, 16, 22 use a switch circuit S1 in FIG. 5, and the switches 17, 20, 21 uses a switch circuit S2 in FIG. 6.

First, the switch circuit S1 will be explained. This switch circuit S1 is constituted by an NPN transistor 25, a PMOS transistor 26 connected between a collector and a base of the NPN transistor 25, and a PMOS transistor 27 connected between the base and an emitter of the NPN transistor 25. When the switch circuit S1 is an on-state, the PMOS transistor 26 is turned on by making the gate of the PMOS transistor 26 at low level, thereby to make a short circuit between the collector and the base of the NPN transistor 25, and the PMOS transistor 27 is turned off by making the gate of the PMOS transistor 27 at high level, thereby to open between the base and the emitter of the NPN transistor 25. As a result, the NPN transistor 25 indicates a diode connection of forward bias between a node T5 and a node T6, and the switch circuit S1 becomes the on-state. On the other hand, when the switch circuit S1 is off-state, the PMOS transistor 26 is turned off by making the gate of the PMOS transistor 26 at high level, thereby to open between the collector and the base of the NPN transistor 25, and the PMOS transistor 27 is turned on by making the gate of the PMOS transistor 27 at low level, thereby to make a short circuit between the base and the emitter of the NPN transistor 25. As a result, the NPN transistor 25 indicates a diode connection of reverse bias between the node T5 and the node T6, and switch circuit S1 becomes the off-state.

Next, the switch circuit S2 is constituted by an NPN transistor 28, an NMOS transistor 29 connected between a collector and a base of the NPN transistor 28, and an NMOS transistor 30 connected between the base and an emitter of the NPN transistor 28. When the switch circuit S2 is an on-state, the NMOS transistor 29 is turned on by making the gate of the NMOS transistor 29 at high level, thereby to make a short circuit between the collector and the base of the NPN transistor 28, and the NMOS transistor 30 is turned off by making the gate of the NMOS transistor 30 at low level, thereby to open between the base and the emitter of the NPN transistor 28. As a result, the NPN transistor 28 indicates a diode connection of forward bias between a node T7 and a node T8, and the switch circuit S2 becomes on-state. On the other hand, when the switch circuit S2 is in an off-state, the NMOS transistor 29 is turned off by making the gate of the NMOS transistor 29 at low level, thereby to open between the collector and the base of the NPN transistor 28, and the NMOS transistor 30 is turned on by making the gate of the NMOS transistor 30 at high level, thereby to make a short circuit between the base and the emitter of the NPN transistor 28. As a result, the NPN transistor 28 indicates a diode connection of reverse bias between the node T7 and the node T8, and switch circuit S2 becomes the off-state.

These switch circuits are, when they are on-state, equivalent to a forward-biased diode and the on-resistance is small. Furthermore, by controlling the gates of vertically stacked same type of MOS transistors with signals of opposite phase, the influence of the parasitic capacitances (a capacitance between gate and drain, and a capacitance between gate and source) of the upper stage MOS transistors 26, 29 is cancelled out by the influence of the parasitic capacitances (a capacitance between gate and source, and a capacitance between gate and drain) of the lower stage MOS transistors 27, 30, and thus the switching speed is also fast.

Figure 7:
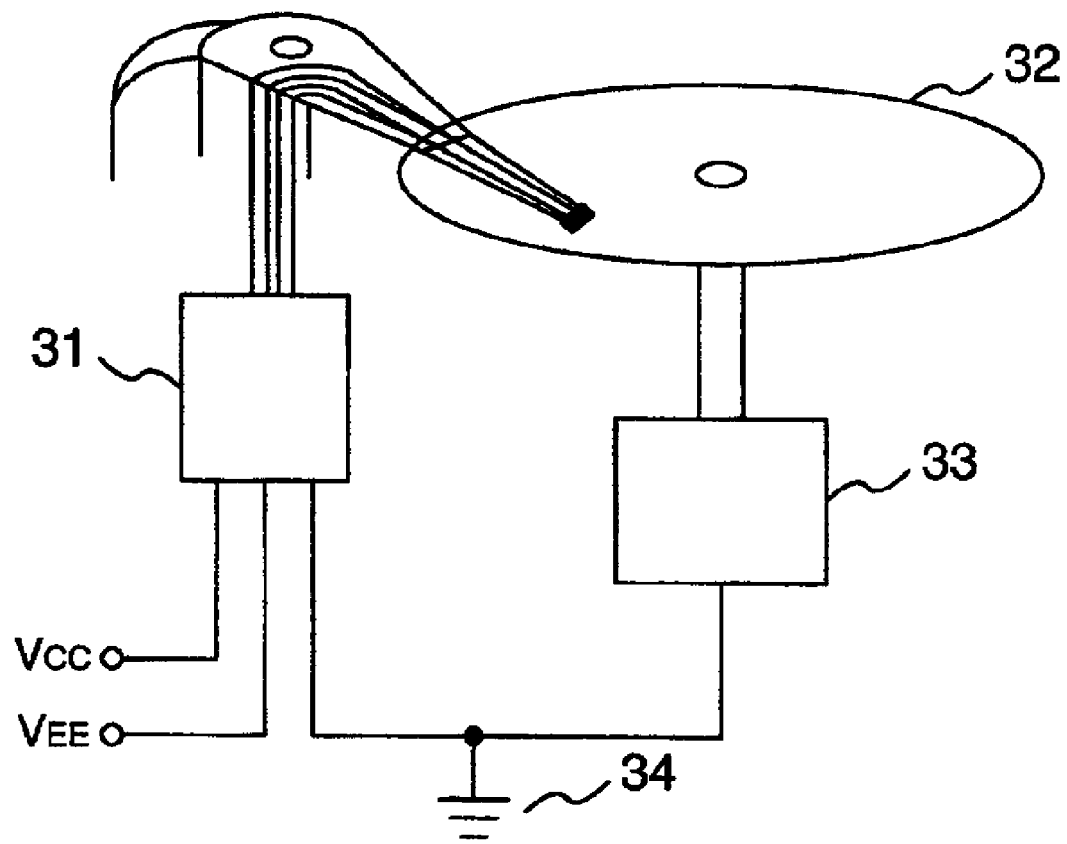
FIG. 7 is a diagram showing a relationship of ground between a magnetic disk and a magnetic head driving circuit.

Next, in the magnetic head driving circuit, it is necessary to change a steady state current depending on the magnetic head and the magnetic recording disk, and it is necessary to maintain the central potential of the magnetic head coil at about 0 volt. As a method for this, the Vcc and V$_{EE}$ potentials are changed. An example of configuration to achieve such Vcc, V$_{EE}$ will be explained with reference to FIGS. 7, 8 and 9. As shown in FIG. 7, a ground terminal of a magnetic head driving circuit of an integrated circuit 31 including the magnetic head driving circuit of the present embodiment and a ground of a driving apparatus 33 for driving a magnetic disk 32 are connected to a ground 34 of a magnetic recording apparatus and the ground 34 is shared.

Figure 8:
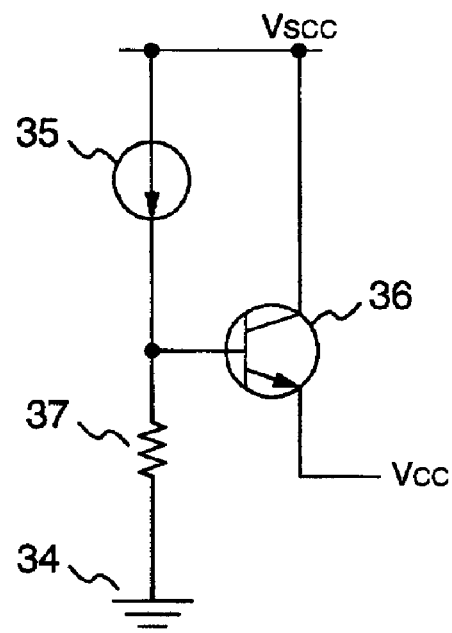
FIG. 8 is a diagram showing a power supply Vcc of the magnetic head driving circuit.

FIG. 8 shows an example of configuration to achieve the Vcc. A voltage Vref1 on the basis of the ground 34 is expressed by a current Iref1 flowing to a current source 35 and a resistor 37 (R37) by expression 14, and by outputting by using an NPN transistor 36 as an emitter follower, Vcc expressed by expression 15 is realized.

$$Vref1 = Iref1 \times R37 \quad (14)$$

$$Vcc = Vref1 - Vthnpn = Iref1 \times R37 - Vthnpn \quad (15)$$

Figure 9:
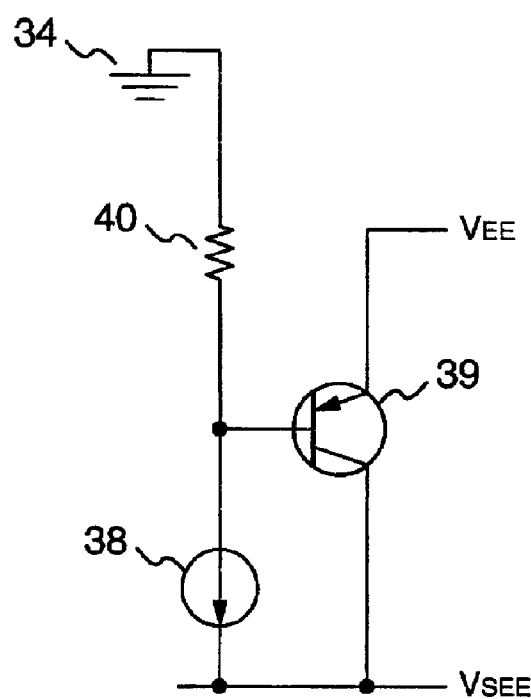
FIG. 9 is a diagram showing a power supply $V_{EE}$ of the magnetic head driving circuit.

Also, FIG. 9 shows an example of configuration to achieve the V$_{EE}$. Similar to the above-mentioned Vcc, a voltage Vref2 on the basis of the ground 34 is expressed by a current Iref2 flowing to a current source 38 and a resistor 40 (R40) by expression 16, and by outputting by using the NPN transistor 39 as an emitter follower, V$_{EE}$ of expression 17 is realized.

$$Vref2 = -Iref2 \times R40 \quad (16)$$

$$V_{EE} = Vref2 + Vthpnp = -Iref2 \times R40 + Vthpnp \quad (17)$$

Here, supposing that, Iref1=Iref2, Vthnpn=Vthpnp, R38=R40, expression 18 is introduced, and Vcc and V$_{EE}$ which are symmetrical with respect to the ground 34 can be obtained, and the central potential of the magnetic head coil 9 can be controlled to be at about 0 volt, and further, the current Iw flowing through the magnetic head coil 9 in the steady state can be expressed by expression 19, and it can be controlled by Iref1.

$$Vcc = Vref1 - Vthnpn = -(Iref2 \times R40 + Vthnpn) = -V_{EE} \quad (18)$$

$$Iw = (Vcc - V_{EE})/(R7 + R8) = Iref1 \times 2R38/(R7 + R8) \quad (19)$$

In the above description, both Vcc and V$_{EE}$ are controlled, however, in the magnetic recording apparatus which does not require to such an extent, only Vcc or V$_{EE}$ may be controlled.

As described in the foregoing, in the present invention, in the magnetic recording apparatus for recording by magnetizing the medium by supplying the magnetizing current corresponding to recording data to the magnetic head coil, there are provided with the magnetic head coil and the main driving circuit symmetrical with respect to the centered magnetic head coil, and the symmetrical sub-driving circuit including at least two pairs of adding circuits, each pair including a positive pulse adding circuit and a negative pulse adding circuit symmetrical with respect to the centered magnetic head coil, and at the time of reversing the direction of the magnetizing current flowing through the magnetic head coil by the main driving circuit, at least one pair of adding circuit of the sub-driving circuit is operated, and positive and negative symmetrical voltages for promoting the reversal of the magnetizing current centered on the magnetic head coil are added, thereby to suppress the variation of the central potential of the magnetic head coil, and to reduce the reverse time, and to enable to reduce the voltage of the power supply voltage. Here, by making the central potential of the magnetic head coil the same as the magnetic disk potential, there is an advantage of preventing the discharge of the magnetic disk. Furthermore, by superposing a voltage to both terminals of the magnetic head coil by the sub-driving circuit, even when under the limited voltage of the withstand voltage of the device of the main driving circuit, it is possible to generate a voltage larger than the power supply voltage in the magnetic head coil, and it is possible to realize the lower voltage of the power supply voltage. Furthermore, at the output of the main driving circuit, by always connecting the resistor in series with the magnetic head coil, when the voltage is adding to both terminals of the magnetic head coil by the sub-driving circuit, there is an advantage of preventing the adding voltage from being applied directly to the main driving circuit.

Figure 10:
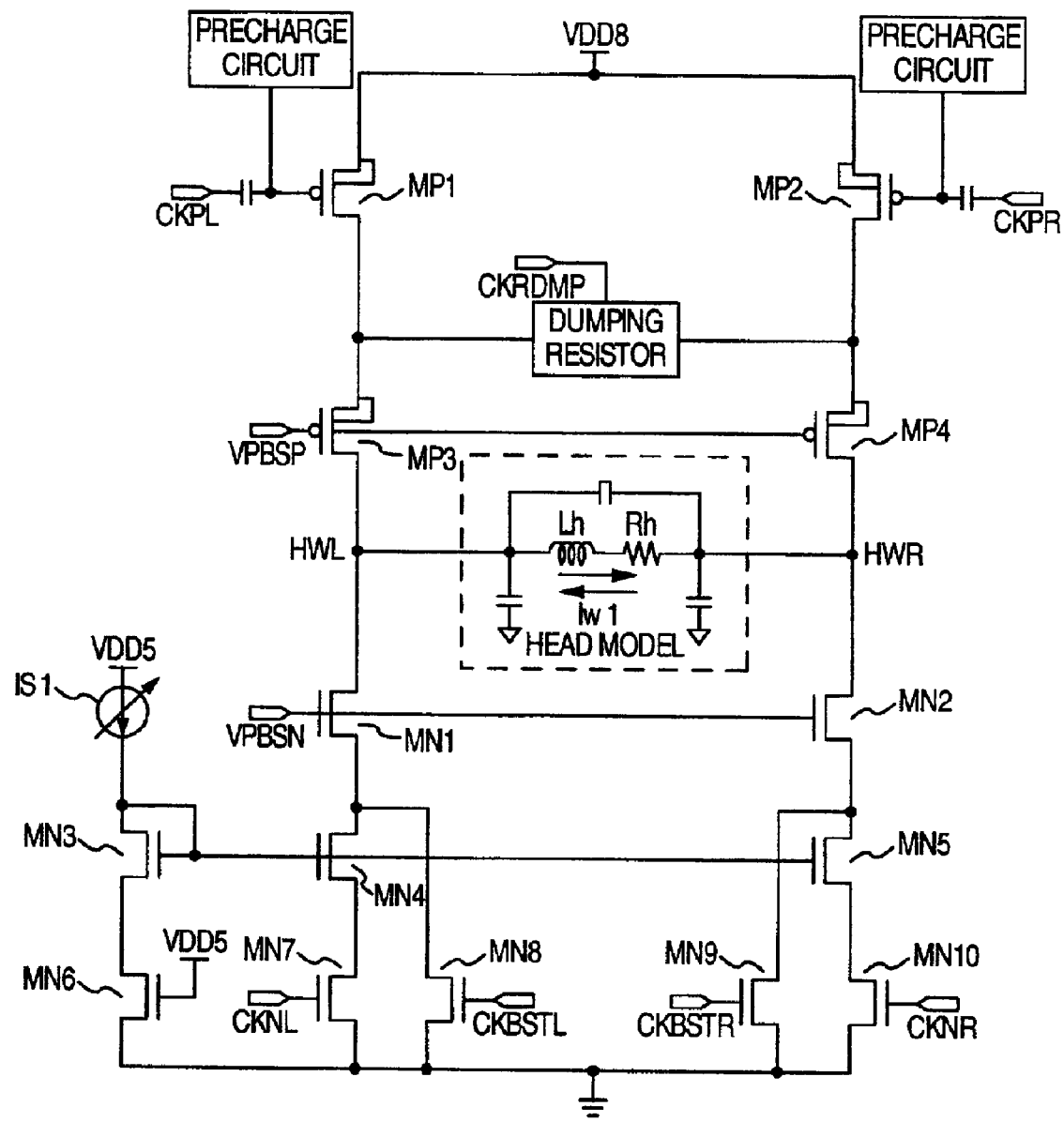
FIG. 10 is a diagram showing an outline of a magnetic head driving circuit.
Figure 11:
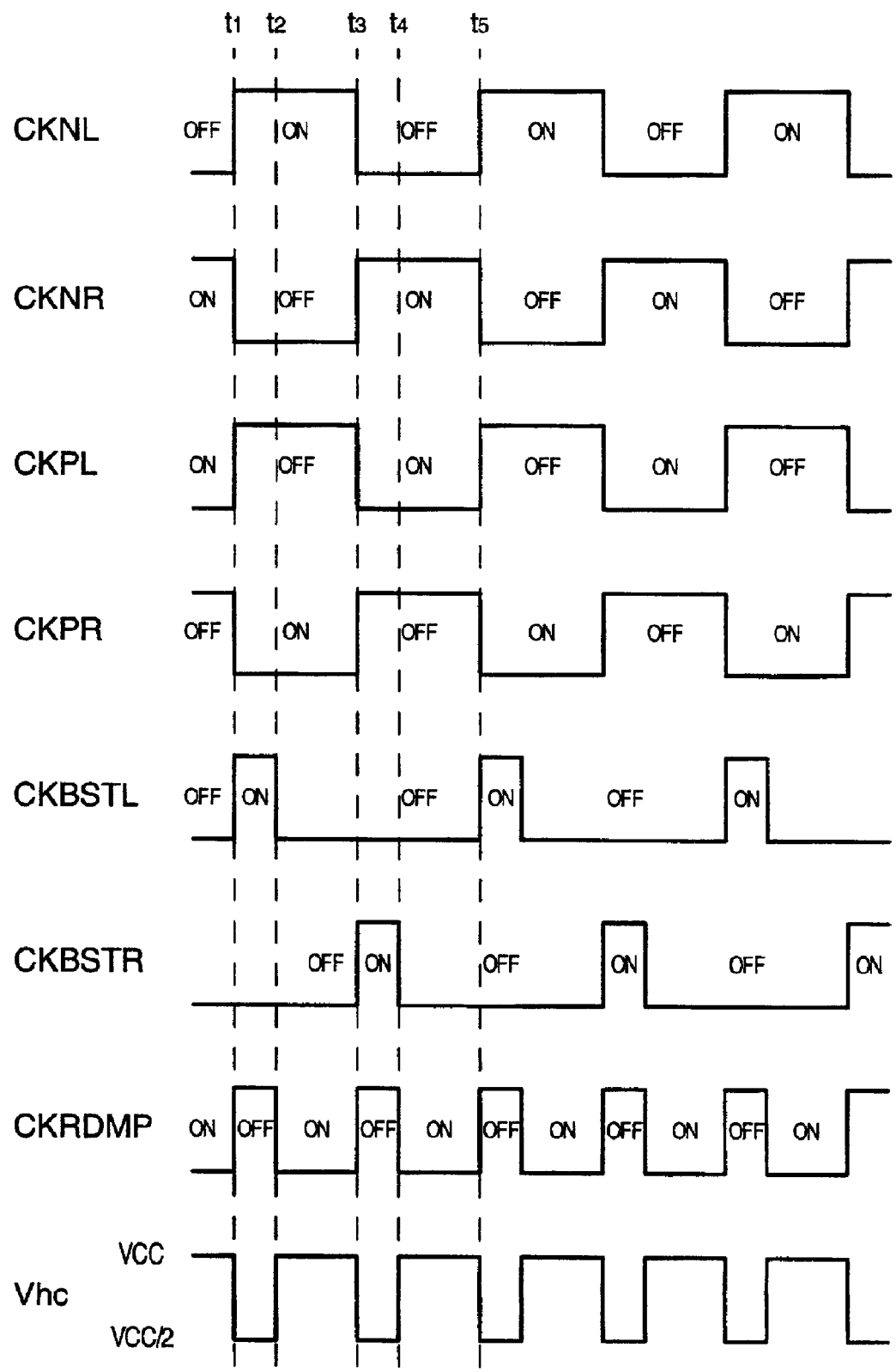
FIG. 11 is a circuit diagram for explaining an operation of the circuit in FIG. 10.

In the above description, the main driving circuit is constituted by using four semiconductor switches, however, the symmetrical sub-driving circuit for applying a large voltage to both terminals of the coil is naturally applicable to the related art example shown in FIG. 10.

Also, in order to obtain the characteristics described above, it is possible to suitably change the configuration of the head driving circuit, and the control method (pulse timing, pulse voltage).

What is claimed is:

1. A magnetic head driving circuit comprising:
    a coil for generating a magnetic field corresponding to data to be recorded;
    a main driving circuit for making a current flow in a positive direction or a negative direction through said coil; and
    a sub-driving circuit for applying a voltage symmetrical with respect to the centered coil by superposing a pair of pulse voltages corresponding to a change-over direction at both terminals of said coil,
    wherein said sub-driving circuit is configured to superpose said pair of pulse voltages such that a potential difference equal to or greater than a power supply applied to said both terminals of said coil.

2. A magnetic head driving circuit according to claim 1, wherein
    resistors are symmetrically connected between said coil and said main driving circuit, and said sub-driving circuit is connected to a connection node between one of said resistors and said coil, and to a connection node between the other of said resistors and said coil.

3. A magnetic head driving circuit according to claim 1, wherein said sub-driving circuit includes at least two pairs of circuits, each pair including a positive pulse adding circuit and a negative pulse adding circuit.

4. A magnetic head driving circuit according to claim 1, wherein said sub-driving circuit has a function to change a pulse voltage value to be adding to said coil in accordance with a current value made to flow by said main driving circuit.

5. A magnetic recording apparatus provided with a magnetic head driving circuit, said magnetic head driving circuit comprising:
    a magnetic disk for recording data;
    a controller for generating the data to be recorded on said magnetic disk;
    a coil for generating a magnetic field corresponding to the data;
    a main driving circuit for flowing a current in a positive direction or a negative direction through said coil; and a sub-driving circuit for applying a voltage symmetrical with respect to the centered coil by superposing a pair of pulse voltages corresponding to a direction of change-over to both terminals of said coil, wherein said sub-driving circuit is configured to superpose said pair of pulse voltages such that a potential difference equal to or greater than a power supply applied to said both terminals of said coil.

6. A magnetic recording apparatus provided with a magnetic head driving circuit, said magnetic head driving circuit comprising:

a coil for generating a magnetic field corresponding to data to be recorded;

a magnetic disk for recording data;

a main driving circuit for making a current flow in a positive or a negative direction through said coil; and a sub-driving circuit for applying a voltage symmetrical with respect to the centered coil by superposing a pulse voltage corresponding to a change-over direction at both terminals of said coil, wherein a central potential of said coil is substantially equal to a potential of said magnetic disk.

7. A magnetic recording apparatus according to claim 6, wherein said sub-driving circuit is configured to superpose said pair of pulse voltages such that a potential difference equal to or greater than a power supply applied to said both terminals of said coil.

* * * * *